W. M. GALLAGHER.
KITCHEN CABINET.
APPLICATION FILED MAR. 28, 1921.
1,406,368.
Patented Feb. 14, 1922.
2 SHEETS—SHEET 1.
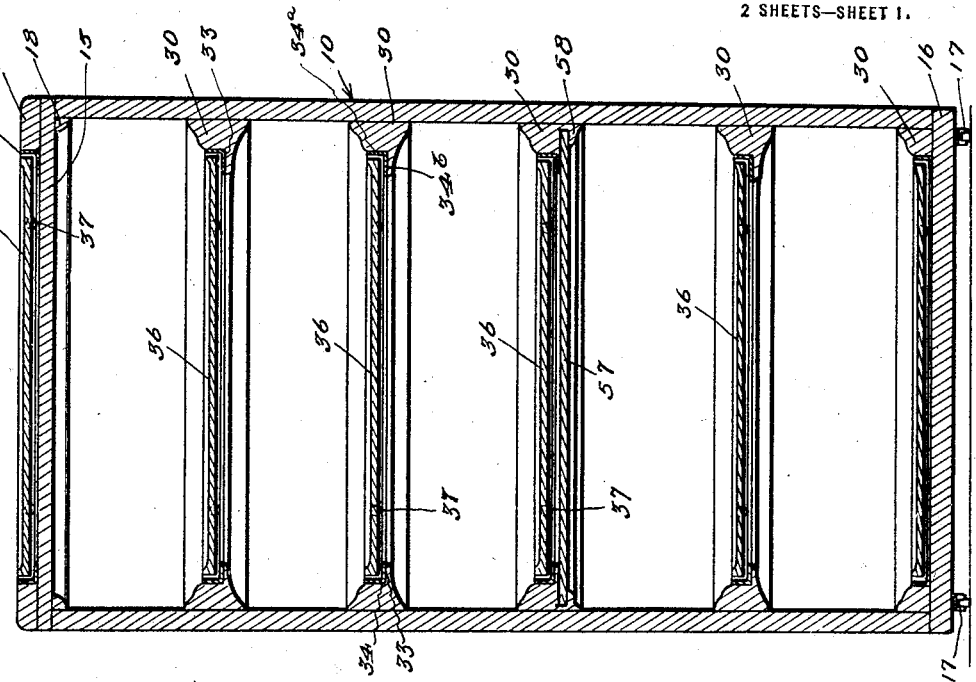
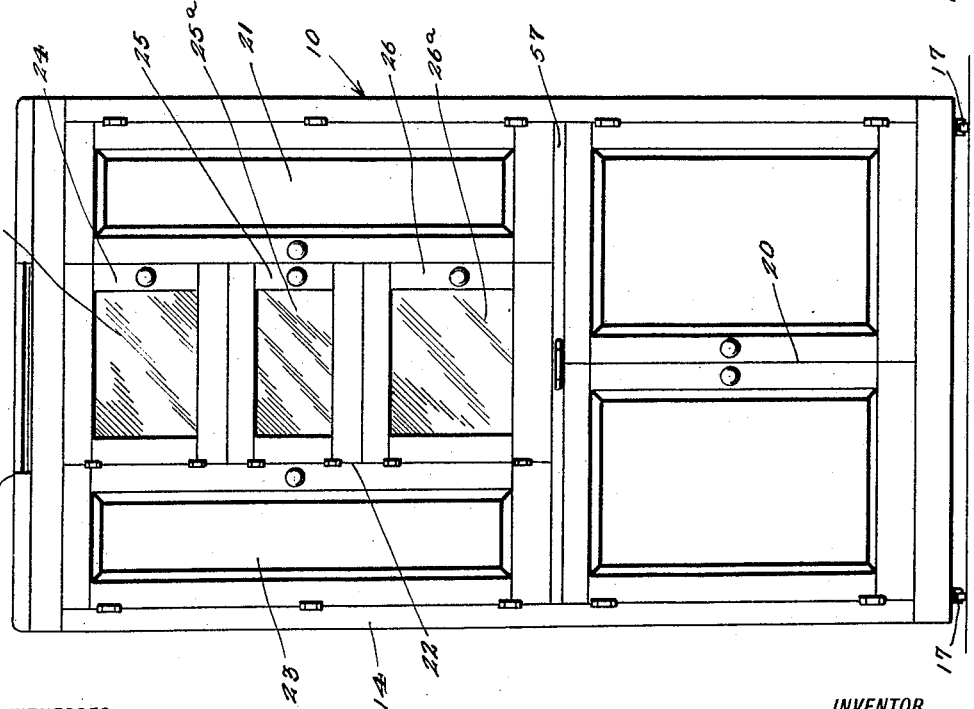
WITNESSES
R. C. Thomas
INVENTOR
W. M. Gallagher
BY
ATTORNEYS

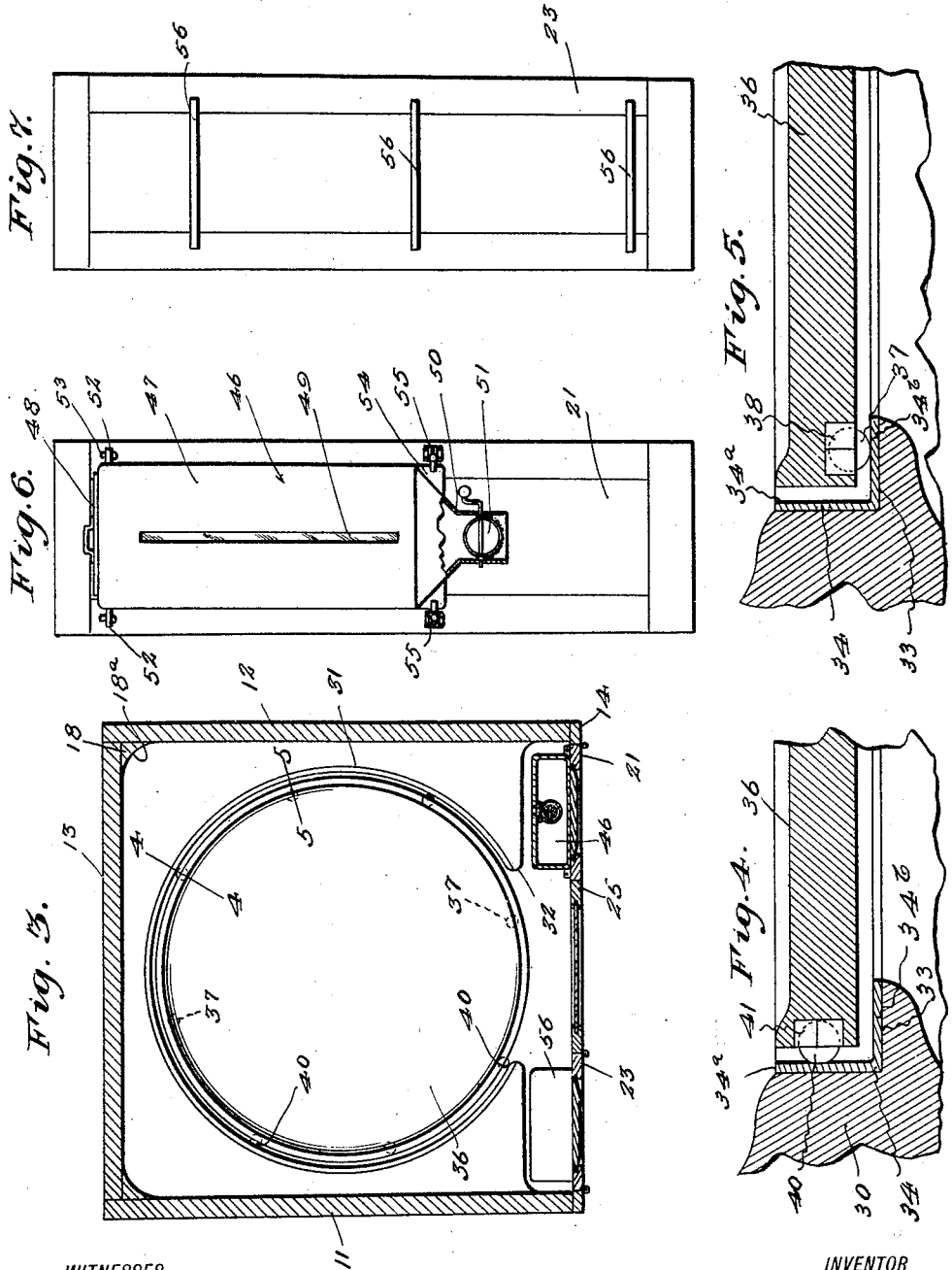

UNITED STATES PATENT OFFICE.

WILLIAM M. GALLAGHER, OF FORT SMITH, ARKANSAS.

KITCHEN CABINET.

1,406,368.  Specification of Letters Patent.  Patented Feb. 14, 1922.

Application filed March 28, 1921. Serial No. 456,071.

*To all whom it may concern:*

Be it known that I, WILLIAM MARTIN GALLAGHER, a citizen of the United States, and a resident of Fort Smith, in the county of Sebastian and State of Arkansas, have invented certain new and useful Improvements in Kitchen Cabinets, of which the following is a specification.

The present invention relates to improvements in kitchen cabinets and has for its object to provide an improvement of this character which has a relatively great capacity, being adapted to hold a relatively large number of utensils, staples or the like, which permits of access to any particular article without the necessity of removing or displacing any of the other articles contained in the cabinet, which is highly convenient and which is of simple and durable construction, attractive in appearance, easy and comparatively inexpensive to manufacture and highly sanitary in use.

Other objects and advantages reside in certain novel features of the construction, arrangement and combination of parts which will be hereinafter more fully described and particularly pointed out in the appended claims, reference being had to the accompanying drawings, forming a part of this specification, in which—

Figure 1 is a front elevational view of the cabinet embodying the invention,

Figure 2 is a view in transverse vertical section,

Figure 3 is a view in horizontal section,

Figure 4 is a fragmentary detail view in section, illustrating a thrust bearing, Figure 5 is a similar view illustrating a supporting bearing, Figure 6 is a detail view in elevation of the container for flour or the like, Figure 7 is a detail view in elevation of the stationary shelves.

Referring to the drawings, wherein, for the sake of illustration, is shown the preferred embodiment of the invention, the numeral designates generally the casing or housing which includes side walls 11 and 12, a back wall 13, an open framework 14 constituting the front wall whereby the front of the casing is open, a top wall 15 and a bottom wall 16. These walls are suitably secured together to provide a unitary structure which may be mounted upon castors 17 or the like. The corners constituted by the adjacent portions of the walls are fitted with strips 18 having concave faces $18^a$ whereby the interior of the cabinet proper or casing is relieved of any corners and thus made easy to clean and highly sanitary.

The open front of the casing is closed by a pair of lower doors designated at 20 and upper doors designated at 21 and 22. The upper door 22 includes a section 23 hinged to the framework 14 and sections 24, 25 and 26 hinged to the section 23. The sections 24, 25 and 26 have incorporated therein panels of glass designated at $24^a$, $25^a$ and $26^a$ respectively.

Within the casing 10 a plurality of open partitions 30 are provided. These partitions are vertically spaced from each other and have a relatively large center opening 31 and a front opening 32. The partitions are identical in construction and each includes an arcuate ledge designated at 33. An arcuate track 34 is arranged upon each ledge 33. These arcuate tracks are L-shaped in cross section and are constructed of suitable metal. They are coextensive with the ledges both with respect to circumferential extent and with respect to the extent of their vertical portions $34^a$ and their horizontal portions $34^b$. These tracks are suitably secured in position in the ledges. A plurality of rotatable shelves 36 are arranged within the casing, one such shelf being associated with each track. Anti-friction bearings such as ball bearings 37 arranged in circumferential series on each rotatable shelf engage the horizontal portion of the adjacent track and support the shelf for rotation thereon. Each ball bearing is provided with a cage 38 inset in the underside of the shelf. Anti-friction bearings such as ball bearings 40 are carried by the shelf and engage the horizontal portion of the adjacent track to take up lateral thrust and preserve true rotation of the shelf. These thrust bearings are also arranged in circumferential series and each thrust bearing 40 is provided with a cage 41 inset in the lateral face of its shelf. A rotatable shelf 42 identical in construction with the rotatable shelves 36 is arranged upon the top of the casing. It is provided with a track 43 and anti-friction bearings for supporting it and taking up the thrust in precisely the same manner as the shelves 36. In this shelf 42, however, the ledge is omitted and strips 44 are substituted in lieu thereof, the strips being open in front as at 45 in Figure 1.

The inner side of the door 21 carries a flour container designated generally at 46 which includes a cylindrical body portion 47 having a removable top plate 48, a gage glass 49, a hopper outlet 50 at its lower end and a butterfly valve 51 controlling said outlet. The container 46 is supported in position by means of a pair of apertured lugs 52 carried by the container and engageable with angular studs 53 carried by the door, the lower end of the container being provided with flat keeper plates 54 engaged by manually operated spring projected latches 55. The door section 23 of the door 22 carries a plurality of stationary shelves designated at 56 adapted to contain articles seldom used.

A slidable work board 57 is carried in a suitable guide 58 arranged within the casing. The guide 58 is preferably integral with one of the partitions 30.

In the use of the cabinet a large number of articles may be placed upon the rotatable shelves and each one of such articles is always accessible as it may be presented immediate to the user by a simple turning or rotation of the shelf. This is easily accomplished as the shelf is floated on its bearings, the bearings 37 supporting it for free rotation and this rotation being enhanced by the thrust bearings 40. This feature also renders the cabinet more accessible when the work board 57 is being utilized, as by turning the shelf to present the article desired immediate to the user it is placed within his reach, notwithstanding the fact that the work board be in outer or working position. The flour container being disposed on the inner side of one of the upper doors is readily available. Moreover, it may be readily removed when desired and it may be readily refilled. The stationary shelves 56 are adapted to contain articles which are seldom used. It is to be noted that the sections 24, 25 and 26 of the upper door 22 being independent of each other permit of access to any one of the upper shelves without opening the cabinet to the others.

It is to be noted that all of the shelves may be readily removed if desired and the interior of the cabinet may be readily cleaned as the cleaner may step within the cabinet and perform the cleaning operation.

It is to be noted that the sections 24, 25 and 26 of the upper door 22 are alined with the upper shelves so that independent access may be had to any one of the upper shelves.

I claim:—

1. In a kitchen cabinet, a casing having its front open, a pair of doors closing the lower portion of said open front, doors closing the upper portion thereof, one of said doors including a plurality of independently hinged sections, a plurality of rotatable shelves arranged within the casing, certain of said shelves being alined with said independently hinged door sections, stationary shelves carried upon one of said upper doors and a flour container carried by another of said upper doors.

2. In a kitchen cabinet, an arcuate ledge, an arcuate metallic track L-shaped in cross section arranged on said ledge and including a vertical portion and a horizontal portion, a rotatable shelf of circular form, anti-friction bearings supporting said shelf on the horizontal portion of said track and anti-friction bearings coacting with the vertical portion of said track for taking up lateral thrust and preserving true rotation of said shelf.

WILLIAM M. GALLAGHER.